Figure 1:
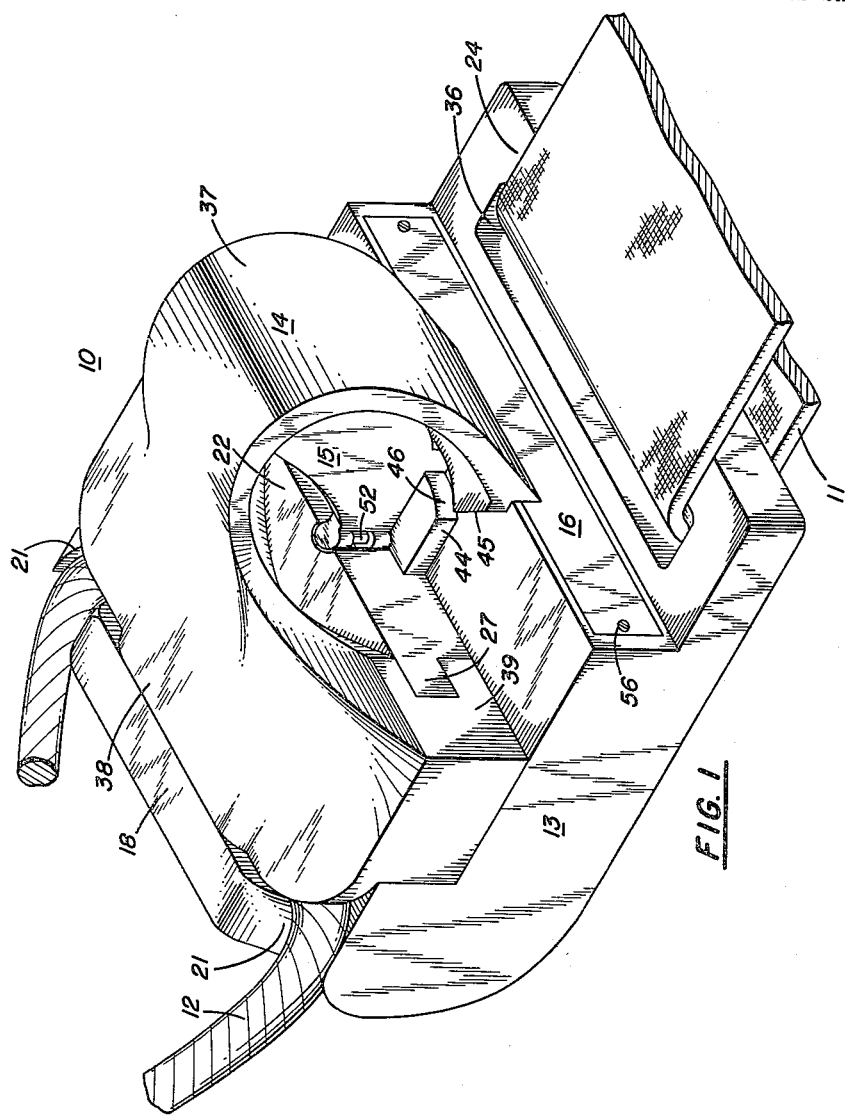

Aug. 1, 1961         J. R. LAWHEAD                2,994,118
                   QUICK-RELEASE DEVICE
Filed May 19, 1959
                                            3 Sheets-Sheet 1

INVENTOR
JOHN R. LAWHEAD

BY  R. J. Tompkins
                 ATTORNEY

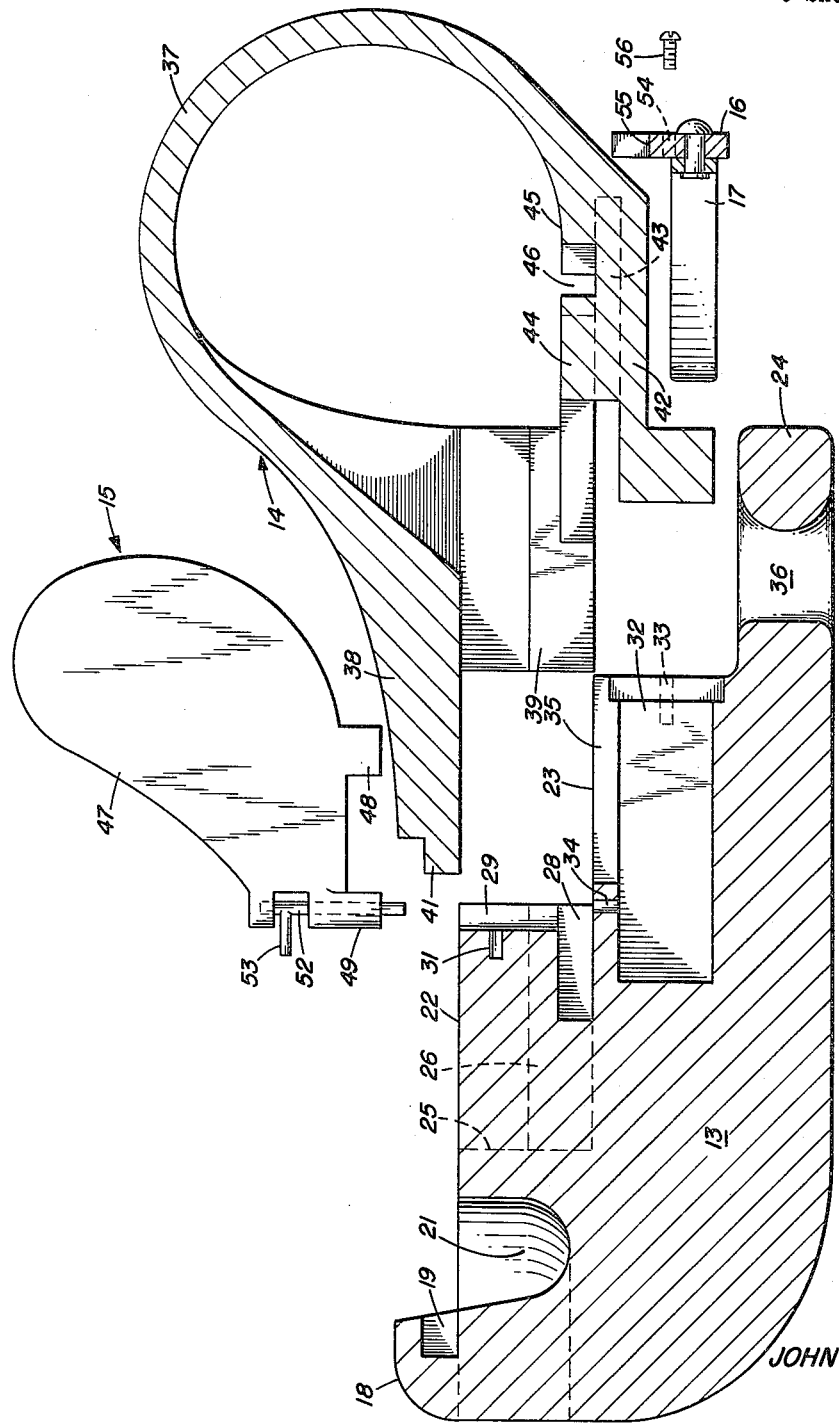

Aug. 1, 1961    J. R. LAWHEAD    2,994,118
QUICK-RELEASE DEVICE
Filed May 19, 1959    3 Sheets-Sheet 3
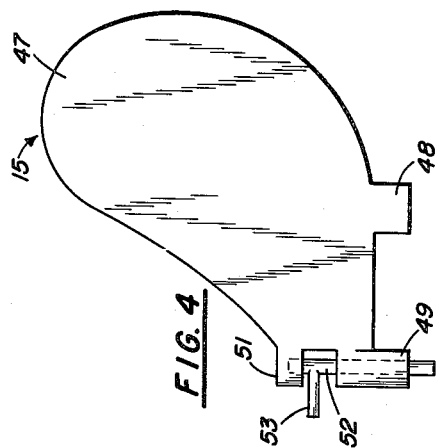
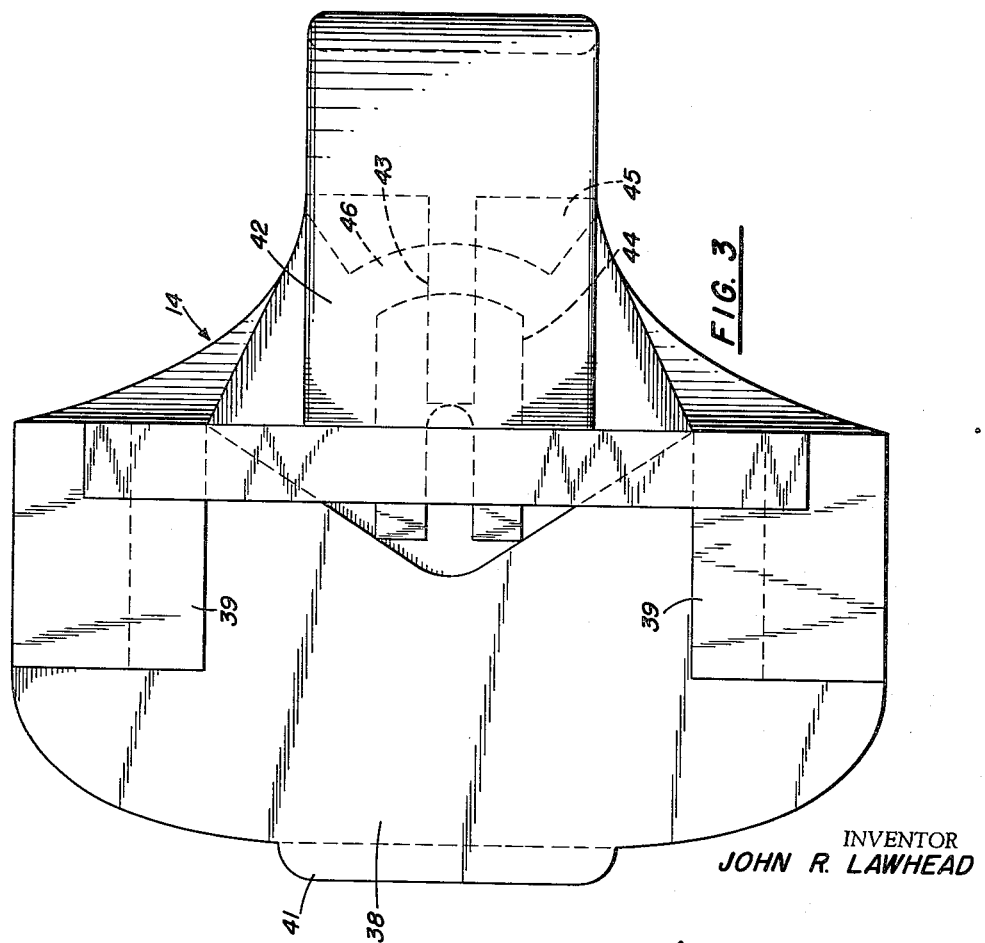
INVENTOR
JOHN R. LAWHEAD
BY *R. J. Tompkins*
ATTORNEY

United States Patent Office 2,994,118
Patented Aug. 1, 1961

2,994,118
QUICK-RELEASE DEVICE
John Raymond Lawhead, McCordsville, Ind.
Filed May 19, 1959, Ser. No. 814,358
4 Claims. (Cl. 24—241)
(Granted under Title 35, U.S. Code (1952), sec. 266)

The invention described herein may be manufactured and used by or for the Government of the United States of America for governmental purposes without the payment of any royalties thereon or therefor.

The present invention relates to a quick-release device and more particularly to a quick-release device for temporarily and securely connecting parts of a torso suit harness, parachute harness or the like, which is able to be quickly and positively released.

Various devices are in use which facilitate the release of straps, such as those of a torso harness suit or on a parachute and riser, in emergency situations. The known devices, however, are usually constructed from a plurality of pivoted parts which depend upon the action of springs for their disassociation. Not infrequently dirt or other foreign matter accumulates between the parts preventing release. In addition springs have been found objectionable in that they often fail to provide the positive and immediate release required in emergency situations. Another disadvantage of the devices now in use is that several motions of the operator are required to actuate the release.

The present invention obviates the deficiencies of conventional devices by employing a trigger slide and a base for joining the straps, and a safety lock for preventing accidental separation of the base and slide. The slide and base may be separated by a single motion of the operator requiring a minimum of physical and mental effort. Since the instant invention has only three movable parts and does not depend upon spring action for release, the device provides dependable, immediate and positive action.

Accordingly, an object of the present invention is the provision of a mechanically stable quick-release device.

Another object is the provision of a quick-release device which includes a minimum number of parts and no springs thereby facilitating immediate and positive release.

A final object of the invention is the provision of a quick-release device including a base, a trigger slide and a safety lock which may be operated with a minimum of mental and physical effort.

Other objects and many of the attendant advantages of this invention will be readily appreciated as the same becomes better understood by reference to the following detailed description when considered in connection with the accompanying drawings wherein:

FIG. 1 is an isometric view of the assembled device;
FIG. 2 is a cross-sectional, exploded view of the base, trigger slide, tension plate and safety lock;
FIG. 3 is a bottom view of the trigger slide;
FIG. 4 is a side view of the butterfly safety lock.

Referring now to the drawings, wherein like reference characters designate like parts in the several views, there is shown a quick-release device 10 which serves to releasably connect straps, such as harness straps 11 and 12, or similar elements.

The device 10 comprises a base 13, a trigger slide 14 and a butterfly safety lock 15. A tension plate 16 with an attached spring 17 serves to yieldably secure the base and trigger slide together.

The base 13 has an upstanding tapered lip 18 at one end, the lip having an elongated recess 19. Around the root of the lip there is a curved groove 21 which serves to receive the strap 12 in the manner shown in FIG. 1.

The remainder of the base forward of the groove 21 comprises three stepped projections 22, 23, and 24. The sides of projection 22 are cut away at 25 and undercut at 26 to form a T-sectioned slide runway 27. A central rectangular recess 28 is provided in the front wall of projection 22 at its base with a semi-cylindrical groove 29 extending from the recess to the top of the projection, the groove 29 having a communicating and inwardly extending, cylindrical cavity 31. The front wall of projection 23 has a counter-sunk rectangular cavity 32 extending the length of the projection to a point beneath projection 22, there being at least one bolt hole 33 at either side of the face of the cavity. The top surface of projection 23 has cut therethrough a hole 34 at the base of groove 29, and a rectangular passageway 35 extending from the front of the projection to a point just short of the hole 34. The third stepped projection 24 is provided with a rectangular aperture 36 through which the harness belt 11, or similar element, is secured.

The trigger slide 14 has a finger ring 37 with a rearwardly extending apron 38 having downwardly and inwardly projecting arms 39 shaped to cooperate with the runway 27 on the base. A lip 41 is provided on the end of the apron adapted to fit into the recess 19 in the lip 18 of the base. A T-shaped member 42 is secured to the bottom of ring 37 and is spaced below the bottom of the arms 39 in such a manner that it will slide into the cavity 32 when the runway 27 and arms 39 move into cooperating relationship. A rearwardly extending tongue 43 is fastened to the top surface of the stem of T-shaped member 42 and lies flush with the bottom surface arms 39, and a bi-furcated element 44 is secured to the top of the tongue between arms 39. The forward end of the element 44 is curved as is the lip 45 of the ring and is spaced therefrom to form the curved, open-ended groove 46.

When the base and trigger slide are engaged, the ears 27 and arms 39 prevent separation and relative movement between the two members. The lip 41 is received within the recess 19 and the apron of the slide overlies the groove 21 preventing release of the strap 12 from the base. The T-shaped member 42 rests within the cavity 32 with the bi-furcated element 44 projecting into the recess 28 and the tongue 43 in the passageway 35.

A safety lock (FIG. 4) is provided to prevent accidental separation of the base and slide. As shown, the safety lock comprises a body 47 having a downwardly extending lug 48 and spaced bearing portions 49 and 51. A pin 52 having an arm 53 is mounted for rotational movement in the bearings with the arm extending outwardly from the space between the bearings.

When the trigger slide and base are in their assembled position, the safety lock is fitted within the finger ring with the lug 48 resting in the groove 46. The bearings lie within the semi-cylindrical groove 29 with the bottom of pin 52 projecting into hole 34 and the arm 53 into cavity 31.

The tension plate 16 is shaped to cover the countersunk cavity 32 and has bolt holes 54 at either side which cooperate with bolt holes 33 so that the plate may be secured to the base by bolts 56. The top of the plate is cut away at 55, and has a substantially V-shaped spring 17 secured to the center of the plate.

When the trigger slide and base are in their assembled position, the spring 17 is inserted into cavity 32 so that the arms of the spring bear against the arms of member 42 biasing the trigger slide into intimate contact with the base. Bolts are then inserted into the bolt holes to secure the plate in assembled position. The plate may be readily removed to permit inspection of the inner base and cleaning of any foreign matter that might clog the slide.

In use the device 10 connects two straps, one of the straps 11 being secured through aperture 36 and the other strap 12 being restrained in groove 21 by the apron 38 of the trigger slide. When it is desired to disconnect the straps, it is merely necessary to insert a finger into the finger ring from either side, whereupon the safety lock will be rotated until the lug 48 is freed from groove 46, and to pull the trigger slide forward. As the slide is pulled forward against the bias of spring 17, the apron will uncover the groove 21 and immediately release belt 12. When the finger ring is released, the spring 17 will bias the slide back into operative engagement with the base.

Obviously many modifications and variations of the present invention are possible in the light of the above teachings. It is therefore to be understood that within the scope of the appended claims the invention may be practiced otherwise than as specifically described.

What is claimed is:

1. A temporary connecting device comprising a base having a rearward stepped portion, a central stepped portion and a forward stepped portion, a tapered rearward lip on said rearward stepped portion, there being a curved groove formed in said base at the root of said lip, a T-sectioned slide runway formed in said base, there being a rectangular cavity in said central portion of said base, a slide on said base, arms on said slide adapted to engage said runway, an apron on said slide adapted to overlie said groove and contact said lip in locked position, a projection on said slide adapted to be received in said cavity and a finger ring rigidly integral with said slide to form a horizontal opening whereby the slide may be moved relative to said base in a parallel direction to an unlocked position so as to release anything placed in said curved groove.

2. A device as claimed in claim 1 including a one-piece safety lock, a pin vertically positioned at one end of the lock for rotatably mounting said lock on said base and within the finger ring, a lug on said lock and there being an opened-ended groove in the slide adapted to receive said lug whereby the slide will be locked to the base when the lug is within the groove and will be unlocked for movement relative to the base when the lug is rotated free of the groove.

3. A device as claimed in claim 2 including a plate mounted on the central portion of said base over the open side of said cavity and a spring fastened to the plate and extending into the cavity in abutting relationship with said projection whereby the slide will be biased into locked position.

4. A temporary connecting device comprising a base having a rearward stepped portion, a central stepped portion and a forward stepped portion, a lip tapered in the rearward direction formed on said rearward portion, there being a curved groove in said rearward portion at the root of said lip, a T-sectioned runway formed in said rearward portion forward of said curved groove, there being a rectangular cavity formed in said central portion extending the length thereof and opening through the front of said central portion, there being a rectangular aperture formed in said front portion, a slide having a finger ring formed integrally therewith, grooved arms on said slide adapted to fit over said runway, an apron on the rearward portion of said slide adapted to cover said curved groove, a T-shaped member connected below said finger ring and adapted to slide into said rectangular cavity, a one-piece safety lock pinned to said base and located inside said finger ring, a lug formed on said lock engaging said slide in the locked position, a plate adapted to cover the opening of said rectangular cavity when said T-shaped member is inserted therein, a spring attached to said plate adapted to bear against said T-shaped member and resist any relative motion between said base and said slide whereby an operator in one motion can release said one-piece lock from said slide and move said slide relative to said base so as to release any item connected in said curved groove, the item being released over the tapered face of said lip.

References Cited in the file of this patent

UNITED STATES PATENTS

| | | |
|---|---|---|
| 461,998 | Combs | Oct. 27, 1891 |
| 741,014 | Covert | Oct. 13, 1903 |
| 1,193,516 | Clarke | Aug. 8, 1916 |
| 1,599,112 | Boots | Sept. 7, 1926 |
| 2,392,368 | Dilbert | Jan. 8, 1946 |
| 2,469,542 | Becker | May 10, 1949 |
| 2,701,402 | Foster | Feb. 8, 1955 |
| 2,802,252 | Gaylor | Aug. 13, 1957 |
| 2,884,676 | Finken | May 5, 1959 |

FOREIGN PATENTS

| | | |
|---|---|---|
| 22,559 | Great Britain | Oct. 3, 1912 |
| 817,676 | Germany | Oct. 18, 1951 |
| 691,630 | Germany | June 1, 1940 |